Jan. 5, 1954

B. V. MOLSTEDT 2,664,967

METHOD FOR CONTACTING GASEOUS MATERIAL
WITH FINELY DIVIDED SOLIDS

Filed March 13, 1950

Byron V. Molstedt Inventor

By W.O. Heilman Attorney

Byron V. Molstedt Inventor
By W.U.[?] Heilman Attorney

Jan. 5, 1954

B. V. MOLSTEDT 2,664,967

METHOD FOR CONTACTING GASEOUS MATERIAL
WITH FINELY DIVIDED SOLIDS

Filed March 13, 1950

Byron V. Molstedt Inventor

By W. O. T Heilman Attorney

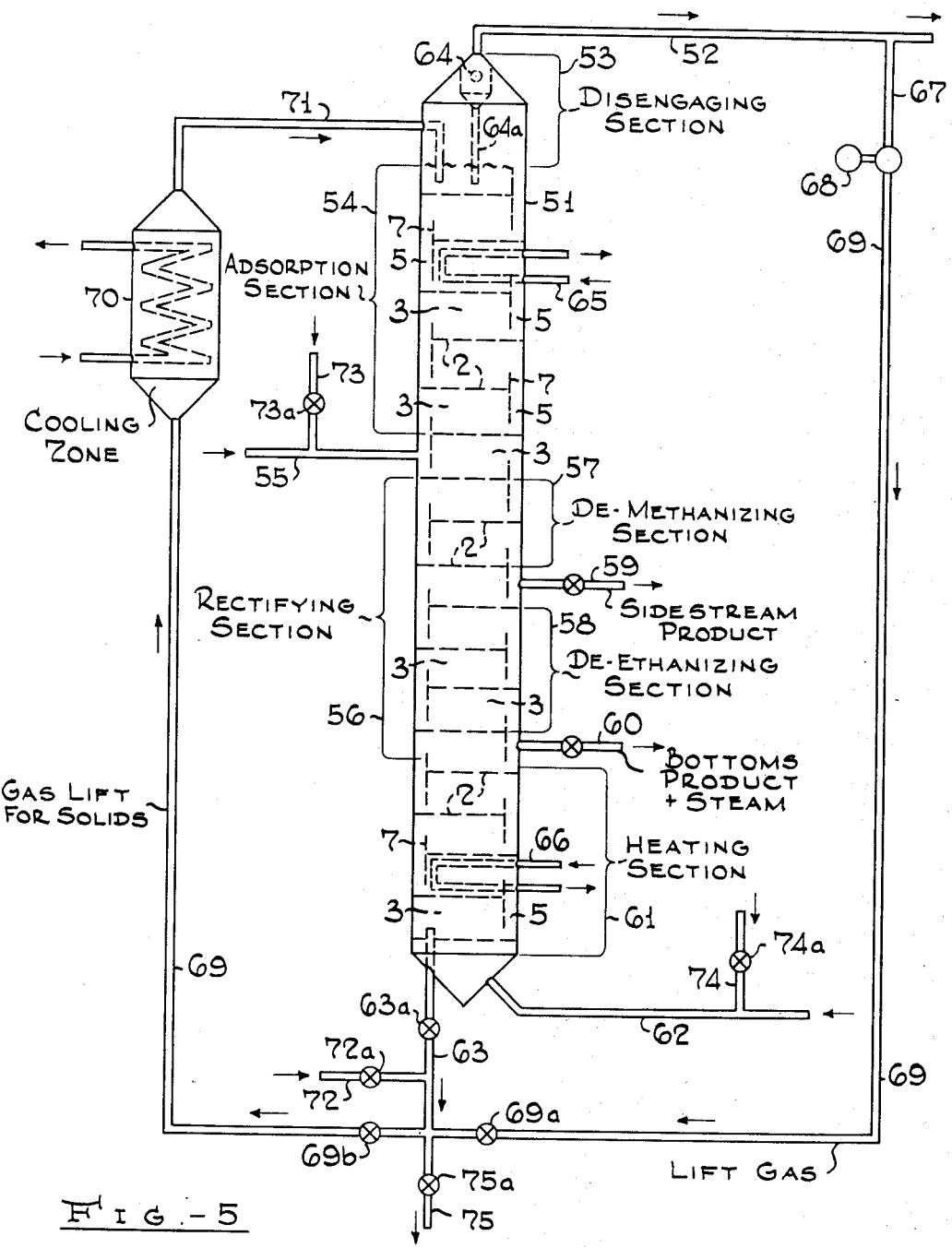

Patented Jan. 5, 1954

2,664,967

UNITED STATES PATENT OFFICE 2,664,967

METHOD FOR CONTACTING GASEOUS MATERIAL WITH FINELY DIVIDED SOLIDS

Byron V. Molstedt, Baton Rouge, La., assignor to Standard Oil Development Company, a corporation of Delaware Application March 13, 1950, Serial No. 149,236

9 Claims. (Cl. 183—114.2)

The present invention relates to a method for contacting vapors and/or gases with fluidized, finely divided solid materials, and particularly for the charging, or the renewing of the charge of a contacting vessel normally employed for such purposes. More particularly, the invention relates to such a method when employed in conjunction with a system in which vapors and/or gases are passed upwardly through a series of superimposed contact chambers or zones in a contacting vessel, while fluidized, finely divided solid materials are passed downwardly in countercurrent relation to the ascending vapors or gases. Still more specifically, the invention is directed toward an operation for the more efficient segregation of normally gaseous hydrocarbons, as, for example, ethane, from other normally gaseous hydrocarbons such as propane, butane, and the like, wherein a finely divided, selectively adsorbent solid material such as carbon is employed. In such a system, the downflowing solid materials are introduced in a fluidized condition, and normally are intended to be maintained in such fluidized condition, during passage downwardly through a contacting vessel, by the ascending vapors or gases. The feed rates of the gaseous and solid materials in such a system, as well as the velocity of flow are so adjusted that the solid particles are fluidized and flow like a liquid.

With further particularity, the invention relates to the method when employed in conjunction with an installation in which the contacting vessel is substantially equivalent to a bubble tray column, including a series of vertically spaced, perforate, transverse plate elements, downcomers from plate to plate, and weirs at the upper end of each downcomer to maintain a predetermined depth of fluidized solid materials on each plate with a vapor space above. Bubble caps may or may not be associated with the perforations in the respective plate elements.

In such a system, difficulty is experienced in charging or loading the contacting vessel with finely divided solid materials. Such difficulty may be due to the fact that when a fluidized stream of solid materials is initially introduced by way of the normal operating means of ingress to the vessel, the fluidizing gas in the incoming stream of solids may be substantially lost at the level of introduction, while vapors and/or gases, separately introduced and to be contacted with the solids, and also to maintain fluidization thereof, may be bypassed through the unsealed downcomers at and below the level of solids introduction. As a result, the solid materials tend to settle and pack at the initial point of introduction, blocking the inlet at that level and preventing further flow of solids into the vessel.

An object of the present invention is to provide a method for contacting gaseous materials with finely divided solids, and in such a system, to overcome difficulty in initiating process flow. It is also an object of the invention to provide for the charging of a contacting vessel, and initiation of normal countercurrent process flow therethrough, without substantial loss of fluidity of the solid materials during the charging operation. It is a further object of the invention to provide a method whereby the normal operating level in one or more contacting chambers or zones, and the operating characteristics thereof, may be restored whenever adversely affected by upset conditions therein.

The invention and its objects may be more fully understood from the following description when read in conjunction with the accompanying drawings, in which Fig. 1 is a semi-diagrammatic illustration showing a typical contacting vessel in vertical section including one means for charging the vessel with finely divided solid materials according to the invention;

Figure 4:
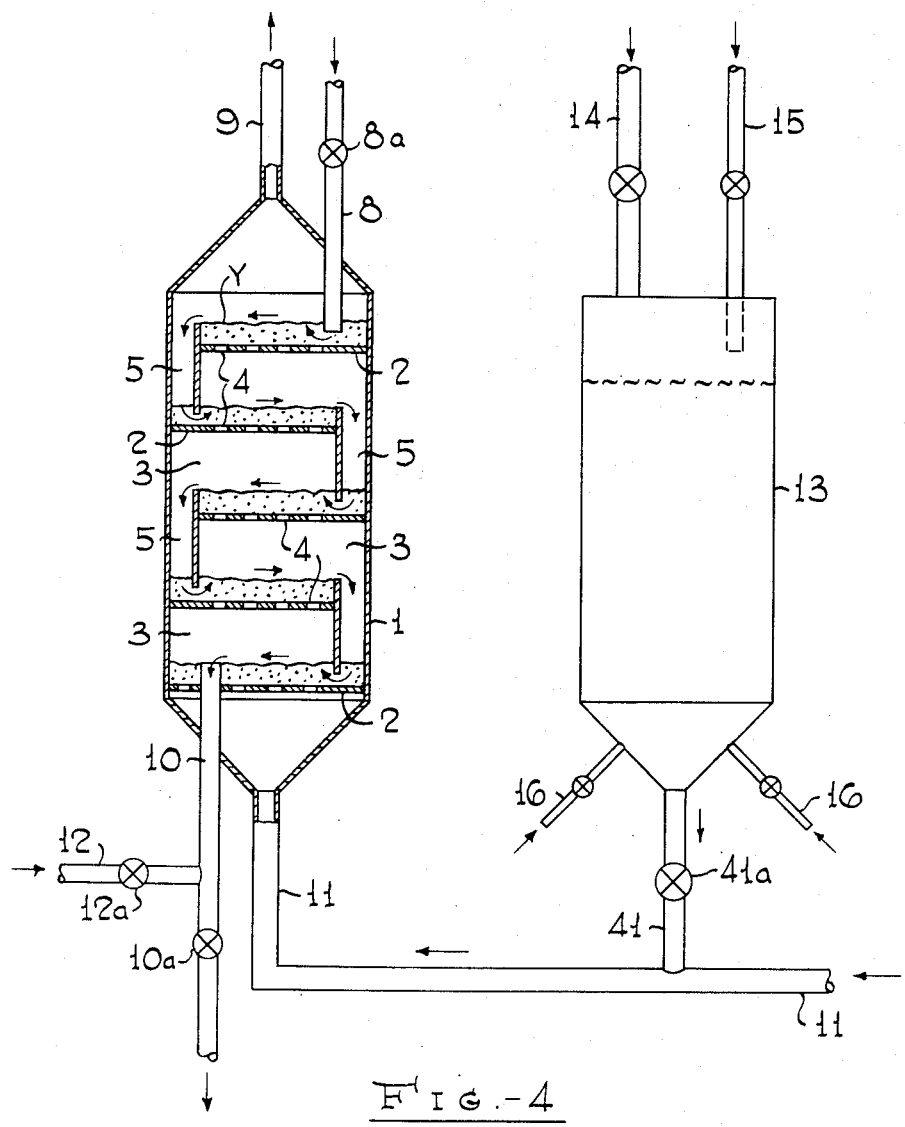

Fig. 4 in similar fashion illustrates an additional adaptation of the method; and Fig. 5 is a similar showing more specifically illustrating the application of the invention to a continuous gas adsorption system.

Figure 1:
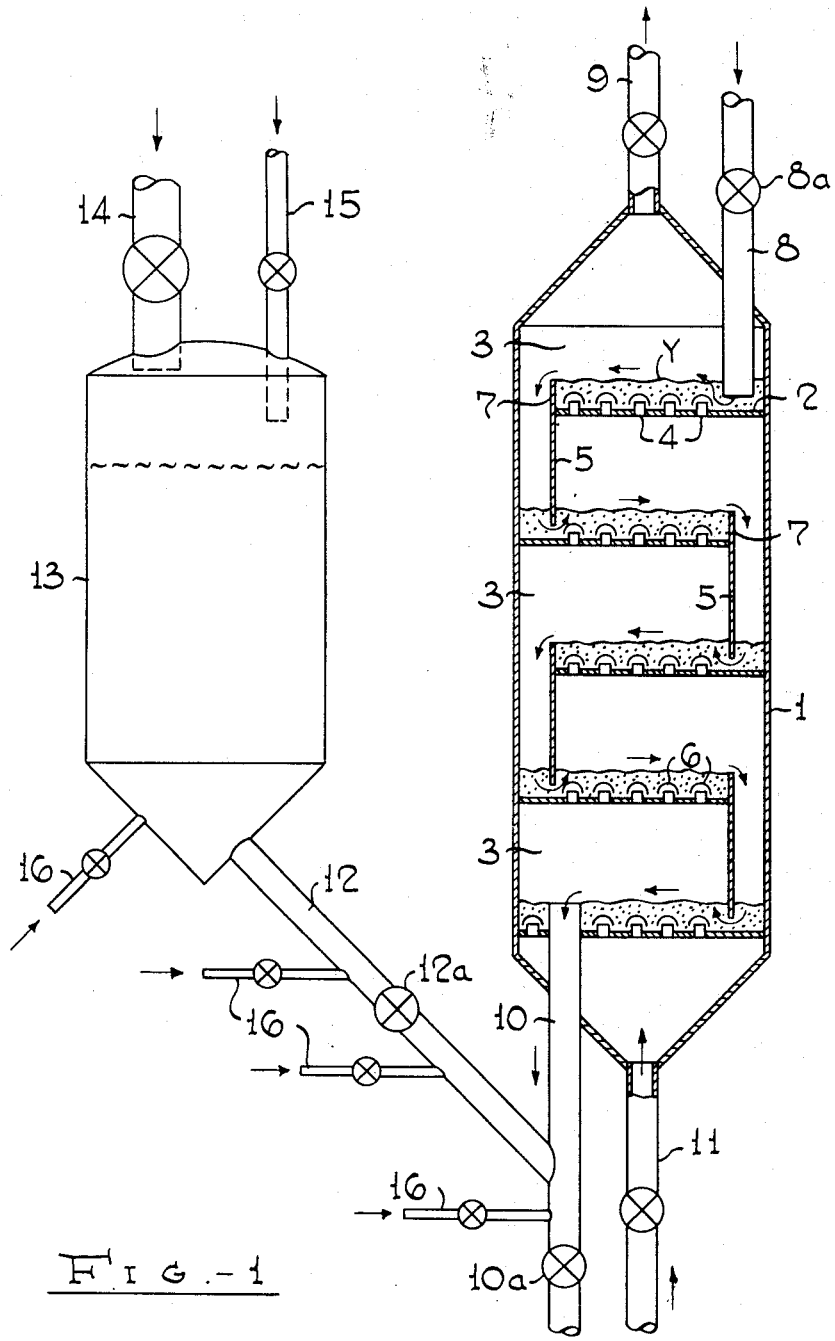

Referring in greater detail to the drawings in which like parts are designated by the same numerals, the numeral 1 designates a bubble tray column, contacting vessel. The vessel 1 is conventionally provided with a series of vertically spaced, transverse, perforate plate elements 2, forming a vertical series of superimposed, contact chambers or zones. These chambers or zones are in communication one with another by way of the passageways 4 formed by the perforations, and downcomers 5 disposed at alternate sides of the vessel from plate to plate. The downcomers extend from the surface of one plate downwardly into vertically spaced relation to the surface of the plate next below. As shown in Fig. 1, the passageways 4 through the plates are each provided with bubble cap elements 6. In addition, each plate 2 is provided with a weir member 7, at the entrance to the downcomer 5, extending upwardly from the plate surface to a level above the lower end of the downcomer from the plate next above. The vessel is also provided with an inlet pipe 8 for fluidized solid materials extending into the upper end of the vessel, and terminating in spaced relation to the uppermost plate 2, below the upper end of the weir 7 for that plate. An outlet from the vessel for gaseous materials is provided as by conduit 9. At the lower end of the vessel is an outlet 10 for finely divided solid materials, and an inlet 11 for gaseous materials to be passed through the vessel.

Exteriorly of the vessel 1, a charging line 12 communicates at one end with the outlet line 10 and at the other end with a receiver or storage bin 13 for finely divided solid materials. The receiver 13 is provided with a valved solids inlet conduit 14, and a valved conduit 15 for introducing a pressurized gaseous material such as an inert gas. The receiver 13, as well as the conduit 12, normally will be provided with aeration taps 16 as may be required to maintain the finely divided solid materials contained therein in a substantially fluidized condition. Suitable control valves 10a and 12a are provided in the conduits 10 and 12 respectively.

Figure 2:
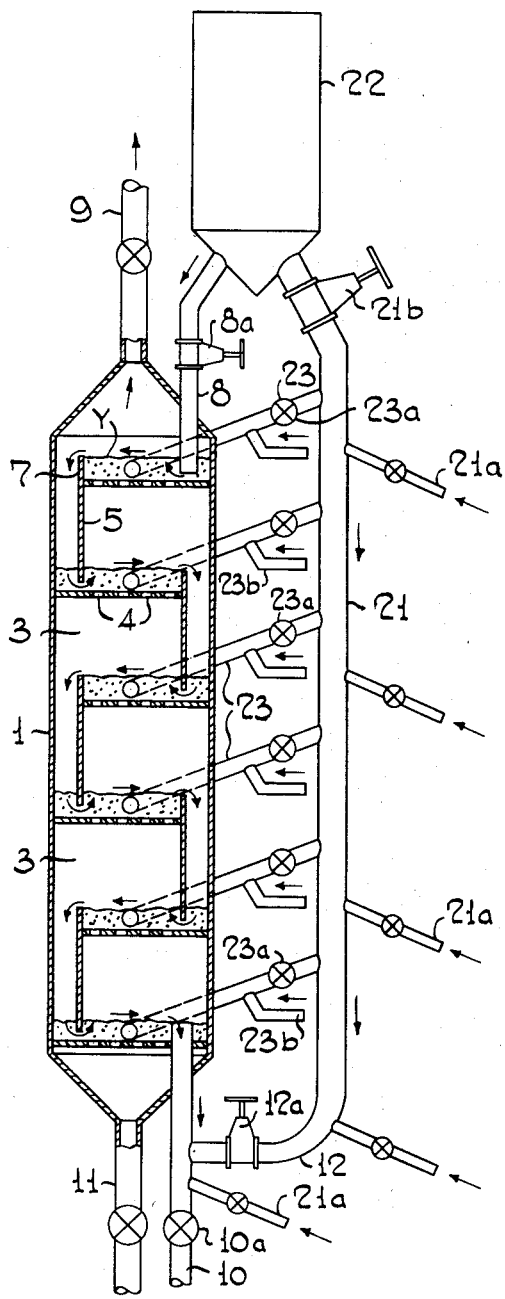
Fig. 2 is a similar showing illustrating another means for introducing the vessel charge, as well as means for restoring the normal operating level and operating characteristics of any one or more of the respective contacting chambers or zones in a contacting vessel.

In the apparatus, as illustrated in Fig. 2, the conduit 12 is connected to the lower end of a standpipe conduit 21. Aeration taps 21a are provided as required to maintain the fluidity of a column of finely divided solid materials in the standpipe. The standpipe itself may be connected to any suitable source of supply for finely divided solid materials, such as a hopper 22 which, if desired, may also provide the source for the normal feed of finely divided solids to the vessel 1, as by means of the line 8. Suitable control valves 8a and 21b are provided in the respective lines 8 and 21. In addition to the conduit connection between the line 12 and the standpipe 21, the standpipe is also connected by way of lines 23, and control valves 23a, to each contact chamber 3 in the vessel 1. The outlet of each of the lines 23 opens into the chamber at a level slightly above the plates 2, and above the lower end of the downcomers 5, but below the upper level of the weir members. Aeration taps 23b may be provided to maintain fluidity of finely divided solid materials passed through these conduits. Under certain conditions, conduits 23 may be arranged so as to discharge directly into each of the downcomers 5, above the lower ends thereof.

Figure 3:
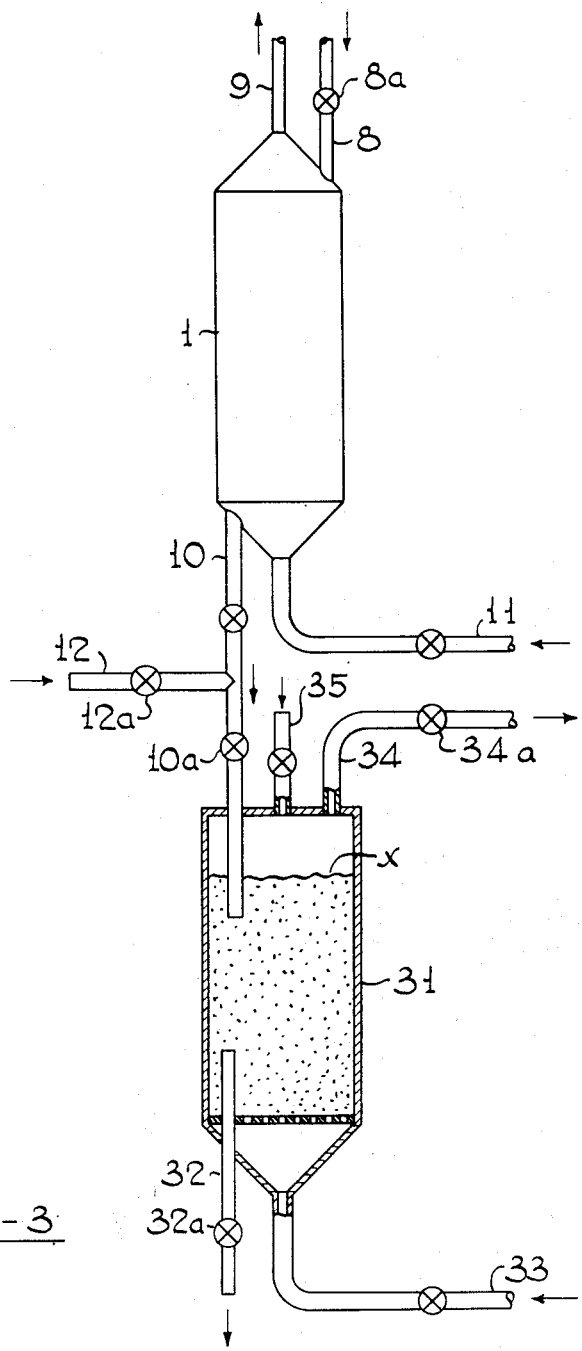
Fig. 3 is a similar showing illustrating another form of the invention.

In the apparatus illustrated by Fig. 3, the vessel 1 is connected by way of the conduit 10 for discharge of finely divided solid materials to a receiver vessel 31, in which the finely divided solid materials, normally discharged from the vessel 1, may be maintained as a body of such materials having a level therein, as indicated at X, with a free space in the upper portion of the receiver above such level. An outlet for solid materials from the receiver 31 is provided by way of the conduit line 32 including a control valve 32a. A valved conduit line 33 provides for the introduction of gaseous materials into the receiver 31, and a conduit line 34, provided with a valve 34a, for the discharge from the receiver of gaseous material introduced by way of the line 33, or with solid materials entering by way of conduit 10. Additional solid materials may be supplied to the receiver 31 by means of valved line 35, or intermittently through conduit connection 12.

In the modification illustrated by Fig. 4, means are provided for charging the vessel 1 by way of the inlet 11 for gaseous materials. As shown, the conduit 41 for fluidized, finely divided solid materials discharges, by way of valve 41a, into the line 11. The conduit 41 may be connected to any suitable source of supply for fluidized solid materials such as the receiver 13 of Fig. 1 shown, or a standpipe such as 21 of Fig. 2.

In normal operation of the contacting vessel as represented in Figs. 1 to 4 inclusive, it is first charged with fluidized, finely divided solid materials so as to provide a bed of such materials in each contacting chamber or zone. This bed of materials in each chamber will have a fluidized level at approximately the height of the weir element 7, and cover the lower end of each downcomer 5. This level is indicated in the drawings by dotted lines designated Y, and the small arrows indicate the normal process flow of the fluidized solid materials through the vessel. Normal process flow through the vessel is maintained by introducing additional quantities of fluidized solid materials by way of the inlet pipe 8, the lower end of which opens above the uppermost plate 2 in the vessel, below the level Y of solid materials to be maintained thereon. Fluidization of the bed of solid materials on each plate is maintained by the flow of gases or vapors to be contacted with the solid materials, and introduced into the vessel by way of the conduit 11. These gases or vapors pass upwardly through the vessel, through each zone, by way of the passageways 4 in each plate element 2 and, where employed, the bubble cap elements 6. The gaseous materials are contacted with the bed of finely divided solid materials on each plate and, in the process, maintain fluidization of the bed. Additional solids introduced by way of the conduit 8, being in a fluidized condition, and thereby simulating the character of a liquid, produce a flow of fluidized solids across the plates, over the weirs 7, and downwardly through the downcomers 5 from plate to plate through the vessel, as indicated by arrows in the drawings. The fluidized solid materials may be removed from the vessel from the lowermost plate in any series of plates as by way of the conduit 10. As previously stated, however, the main problem involves the initial charging of the vessel, and the individual plates, so as to prevent bypassing of the gaseous materials entering from line 11 through the downcomer elements in preference to the passageways 4 during the charging operation. According to the present invention, this is accomplished by the proper employment of the apparatus now shown and described.

In the operation according to the present invention, and with particular reference to Fig. 1 of the drawings, valves 8a and 10a are closed, and the valve 12a opened. By exerting a suitable pressure on the solid materials in the vessel 13, by way of the pressurizing line 15, the fluidized solid materials contained in the storage bin or receiver 13 are forced through the line 12 into the line 10 and upwardly therethrough into the vessel 1. Continuing this introduction of fluidized solid materials, the entire vessel may be flooded from bottom to top. During the introduction of solid materials through the line 10, gaseous materials, and preferably an inert gas, is introduced through the normal feed line 11. As each chamber or zone is flooded, the fluidity of the solid materials therein is maintained by the passage of the gaseous materials introduced by line 11 through the total mass of solid materials in the flooded chamber. As charging continues in this fashion, each chamber is flooded in turn with a fluidized body of finely divided solid material. The fluidizing gases introduced by way of line 11 are permitted to escape through the conduit 9 opening from the upper portion of the vessel. During this charging operation, additional gaseous materials for fluidizing the incoming solid materials may be introduced by way of aeration taps 16. Also, if required, additional solids may be added to the storage bin 13 by way of the valved line 14.

When the vessel 1 has been substantially filled with fluidized, finely divided solid materials, at least to the level Y on the uppermost plate 2, the valve 12a is closed, and valves 10a and 8a opened substantially simultaneously. A normal flow of fluidized solid materials may be then initiated by way of the line 8 into the vessel, and by way of the line 10 from the vessel. At substantially the same time, the normal process flow of gaseous materials which are to be contacted with the finely divided solid materials in the vessel, may be initiated by way of line 11. Immediately following the initiation of normal process flow, the withdrawal of solids from the vessel by way of line 10 is regulated so as to remove the excess solid materials introduced for the purpose of flooding and charging the vessel. When the level of the material in each chamber has been reduced to the normal process level, normal process flow of solid materials into and out of the vessel is restored. The means and the steps for controlling flow of either the fluidized, finely divided solids or the gaseous process materials to be contacted therewith are generally conventional, and need not be illustrated or described in connection with this invention.

In the employment of the apparatus illustrated by Fig. 2, the operational steps for charging the vessel 1 by way of the lines 12 and 10 may be substantially the same as described with reference to Fig. 1. The initial charge of finely divided, fluidized solid material passes from the standpipe 21 through the valve 12a into the line 12 and thence into line 10 under the fluistatic pressure of the column of materials contained in the standpipe. When the vessel 1 has been flooded, the valve 12a is closed and valves 10a and 8a opened to initiate normal process flow of fluidized solid materials in the same manner as described with reference to Fig. 1. As shown in Fig. 2, the standpipe 21a is supplied from a hopper or storage bin 22 normally employed to supply the material required for normal process flow through the column by way of line 8. Such connection and method for supplying fluidized solid materials to the standpipe 21 is optional, however, and the standpipe may be supplied from any suitable source.

In addition, the apparatus illustrated by Fig. 2 provides means for an operating procedure not shown in the apparatus illustrated by Fig. 1. In normal operation of the system, a sudden surge of process gas or vapors within the vessel, or from line 11, may so displace the normal bed of fluidized solids on one or more of the plate elements 2, as to uncover the lower end of a related downcomer element 5. If this occurs, and the downcomer seal is broken, the process gas or vapor may bypass the bed of solids on the next plate above by way of the uncovered downcomer. With such plate bypassed, the bed of solids thereon may lose fluidity sufficiently to interfere with normal process flow of solids through the vessel. Under such circumstances, it is contemplated that normal process conditions may be restored to any affected plate by admission of any required quantity of fluidized solid material to such plate from a line 21 by way of a connecting conduit 23. In addition, the conduits 23 provide an auxiliary or alternate means for initially charging the vessel. In such instance, with the valve 12a closed, the valves 23a may be opened so as to simultaneously introduce a sufficient quantity of finely divided solid material from the standpipe 21 onto each plate 2 as to seal the downcomers 5 and establish the required operating level of finely divided solid materials. During such introduction of the solid materials, gas flow may be initiated through the line 11 so as to avoid settling or packing of the solid materials, entering from the lines 23, as a result of losing the gaseous, fluidizing medium contained in the entering stream. Under certain circumstances, it may also be desirable to simultaneously commence flow of finely divided solid material into the vessel by way of conduit 9 during the charging step. As soon as each plate has been charged to its proper level, flow through the lines 23 may be stopped by closing valves 23a, and the normal process flow provided entirely by introduction of fluidized solid material by way of the line 8.

The apparatus shown in Fig. 3 illustrates a further application of the method to another type of process operation. In this modification of the invention, the finely divided materials discharged from the vessel 1 normally are led into a receiver 31 by way of the line 10, and permitted to accumulate therein to a substantial degree, excess solids being withdrawn by way of conduit 32. The accumulation of solids in receiver 31 may be maintained in a fluidized condition by introduction of a gaseous or vaporous material through the line 33. Vapor flow through the vessel 31 is maintained by release of the gaseous material introduced through the valve 34a and line 34. As previously noted, additional solid materials may be supplied to the receiver 31 by way of the valved line 35.

When, for any reason, it is necessary to charge or recharge the vessel 1, the finely divided solid material contained in the vessel 31, or a new charge of such material introduced thereto by way of line 35, may be forced to reverse normal flow through the vessel by closing or partially closing the valve 34a, while continuing to introduce a pressurized gaseous material through the line 33. In this way, a pressure may be built up in the vessel 31 sufficient to force the fluidized material upwardly through the line 10 into the vessel 1. The introduction or re-introduction of fluidized material may be thus continued until the column 1 has been flooded in much the same fashion as described in conjunction with the operation of the apparatus as shown in Fig. 1. When the charging or flooding has been completed, the normal process flow may be restored by re-opening the valves 34a and 32a, and reducing the pressure on the vessel 31 to such extent as to create a pressure differential between the vessel 31 and the stream of fluidized, finely divided solid materials contained in the line 10, and in the vessel 1. During normal process flow, solid materials may be continuously removed from the vessel 31 by way of the line 32 and valve 32a. The system as illustrated by Fig. 3 is especially suitable where the finely divided solid material is an adsorbent material such as charcoal, and the vessel 31 is employed in the normal process operation as a stripper in which adsorbed materials may be stripped as by the introduction of steam by way of conduit 33.

The reverse flow charging method, as illustrated by Fig. 4, contemplates the employment of a gaseous material, introduced in normal process flow through the line 11, as a carrier and fluidizing agent for a charge of finely divided solid materials such as may normally be introduced by way of the conduit 8. According to the charging method contemplated, the valves 8a and 10a are closed and a stream of gaseous material, preferably an inert gas such as a flue gas, is passed through the line 11 into the vessel 1 and discharged therefrom by way of the line 9. A stream of fluidized solid materials is then introduced into the line 11, and carried therethrough by the stream of gaseous material into the vessel 1. As shown in Fig. 4, the stream of fluidized solid materials may be derived from a pressurized storage bin or hopper 13, as shown in this figure, and in Fig. 1, which is connected to the line 11 by way of the conduit 41 and valve 41a. Alternately, the line 41 may be connected into a standpipe such as the standpipe 21 of Fig. 2 in substantially the same manner as is the line 12 shown in Fig. 2, or the line 41 may be connected to any other suitable source of supply for finely divided solid material. In the charging method thus provided, the finely divided solid materials are introduced into the vessel 1 in a substantially dispersed phase, as compared with the introduction of such materials by way of the solids discharge conduit 10 or the conduit connections 23. Therefore, it is necessary that the introduction of solids be controlled in such fashion that, upon completion of the charging step and initiation of normal process flow through the column, settling of the dispersed materials introduced will not result in a loss of downcomer seals. This possibility may be substantially avoided by introducing a quantity of solid material at least equal to, and preferably in excess of, the sum of that normally required by each plate in order to maintain an operating level thereon. The desired result may also be insured by continuing introduction of solid materials through the line 11 for a suitable period after initiation of process flow through the conduits 8 and 10. When the several plates have been suitably charged in this fashion, the flow of solid materials through the line 11 may be cut off by closing the valve 41a and the flow of process gases and/or vapors initiated or continued through the line 11.

As has been indicated, the charging vessel or source of supply such as the vessel 13 may be either an auxiliary vessel specifically provided for that purpose or another process vessel such as the hopper 22. In most instances, a positive pressure differential of anywhere from 2 to 20 p. s. i. g. will be required to cause solids to flow from the charging vessel into the contacting vessel. Where a pressurized charging vessel is not employed, such pressures may be obtained by producing a fluistatic head in a column of materials, as by employment of a standpipe such as the standpipe 21 of Fig. 2. The pressures applied, as well as the density of the material introduced, may vary widely according to the type and nature of the solid materials handled, and the nature of the normal process operation.

Referring to Fig. 5, the invention will be described, for purposes of example only, with reference to a process for the separation of $C_2$ and $C_3$ hydrocarbons, from a mixture of $C_1$ to $C_3+$ and lighter gaseous components, by means of charcoal adsorption. Numeral 51 represents an adsorption tower or vessel provided in descending order with a tail gas removal line 52, an uppermost disengaging section 53, an adsorption section 54, a gas feed line 55, a rectification section 56 comprising a de-methanizing zone 57 and a de-ethanizing zone 58, a $C_2$ vapor removal line 59, a $C_3+$ vapor removal line 60, a desorber-heater section 61, a steam entry line 62 and a solids withdrawal line 63.

Internally, the vessel, and each section therein, is divided into a vertical series of contacting chambers or zones by means of a plurality of vertically spaced transverse perforate plate elements 2 arranged in a manner similar to that shown in Fig. 1, and including downcomer elements 5 and weirs 7. As desired, the passageways 4 formed by the plate perforations may be provided with bubble cap elements, such as elements 6 of Fig. 1. In addition, a cyclone, or centrifugal separator 64 in the disengaging section 53 is connected at one end to the conduit 52, and at the other end to a dip-leg 64a, extended downwardly into the vessel. Heat exchange means such as cooling coil 65 and heating coil 66 are provided in the adsorption and heating sections respectively.

Exteriorly of the vessel, the conduit 52 is connected by way of a branch conduit 67 and pump 68 to a solids transfer conduit 69. This conduit is provided with suitable valves 69a and 69b, located in the line at opposite sides of the connection thereto of the solids drawoff line 63. Beyond the connection with line 63, the conduit 69 opens into a cooling zone contained in cooler 70, and a discharge conduit 71 communicates between the cooler 70 and the disengaging section 53 of vessel 51.

The apparatus as set forth above, is supplemented by a charging line 72, opening into conduit 63, and provided with valve 72a. Similar connections may be made to the conduits 55 and 62, as by means of charging lines 73 and 74, respectively, provided with valves 73a and 74a. The charging lines as shown may be connected to any suitable source of solids supply as shown and described in Figs. 1, 2 and 4 respectively.

In an operation employing the apparatus of Fig. 5, the feed gas comprising a mixture of methane, $C_2$, $C_3$ and heavier hydrocarbons, and less adsorbable gases such as nitrogen and hydrogen is introduced under pressure into the adsorption vessel 31 via line 55 at a point between the adsorption section and the rectification section. A fluidized mass of finely divided charred organic material, such as a charcoal adsorbent, cooled to approximately 160° F. to 200° F. is introduced into the top of the adsorption section of the vessel, at the disengaging section, via line 71. The fluidized adsorbent passes down the vessel from plate to plate at such a rate that substantially all the $C_2$ and heavier hydrocarbons are selectively adsorbed on the adsorbent within the adsorption section while the methane and lighter components, e. g., nitrogen and hydrogen, pass overhead via cyclone 64, and leave the vessel via line 52. Entrained charcoal is returned from cyclone 64 to the vessel via dip-leg 64a. The adsorbent material passes down the vessel into the rectification section 56 below the feed point.

In the upper part of the rectification section, i. e., in the de-methanizing zone 57, any methane, nitrogen, hydrogen, etc. which may have remained on the adsorbent as it passes down through the vessel are desorbed by the action of the refluxed $C_2+$ hydrocarbon vapors, which have been desorbed in the lower part of the rectification section, due to the more selective action of the charcoal for the heavier hydrocarbons. The displaced materials flow upwardly past the gas feed line 55 into the adsorber section and are eventually withdrawn from the system via line 52.

In the lower area of the rectification section 56, the adsorbent is refluxed with the heavier components of the hydrocarbon feed, for example the $C_3+$ hydrocarbons similarly released in the lower section of the tower by the action of the desorber, whereby the desorption of the $C_2$ hydrocarbons is brought about. The $C_2$ hydrocarbons containing small equilibrium quantities of $C_3+$ hydrocarbons are removed in controlled amounts as a vapor stream from a point near the center of the rectification section via line 59 at a temperature of about 240° F. The material thus withdrawn provides a very desirable feed material for a subsequent alkylation process.

The charcoal substantially free of $C_2$ and lighter components passes from the lowermost area of the rectification section 56 into the desorber 61. In the desorber the desorption of the $C_3+$ hydrocarbons is accomplished by means of heat supplied indirectly to the enriched charcoal by suitable heating means such as by condensation of high-boiling liquid, by hot flue gas, etc. The action of the heat together with the stripping action of steam introduced via line 62 disengages the $C_3+$ hydrocarbons from the adsorbent and they pass upwardly through the desorber section with the product portion taken out through line 60, at a temperature of about 350° F. and the remaining portion returned as reflux vapor to the bottom of the rectification section 56. The $C_3+$ product stream contains appreciable amounts of water vapor which may be removed therefrom by appropriate cooling or quenching operation.

Additional side streams representing one or more intermediate cuts may be obtained by expanding the rectifier section and removing, in addition to a more concentrated $C_3$ product, heavier hydrocarbons such as $C_4$ and $C_5$ side streams at lower points in the rectifier section. The major component of each additional sidestream would be contaminated chiefly with small equilibrium quantities of heavier material.

The hot stripped charcoal from the desorber-heater 61 at a temperature of about 500° F. is led via line 63 and gas lift line 69 to a cooling zone 70 in which the charcoal is partially cooled to a temperature in the range of 160° F. to 200° F., which does not approach too closely that of the water (90–110° F.) employed in the cooler. The partially cooled charcoal enters the top of the disengaging section 53 via line 71. In the disengaging section, recycled tail gas from line 52, through line 67 and pump 68, employed as lift gas, plus the net tail gas overhead from the adsorption zone are removed via line 52 while the charcoal descends into the vessel. The tail gas emerging from the adsorption vessel via line 52 is removed in part as net product to a tail gas water scrubber or filter, not illustrated, where the remaining entrained charcoal of fine particle size is removed therefrom.

The finely divided charcoal removed from the bottom of the vessel 51 by way of the line 63 is introduced into the transfer line 69 and a portion of the tail gas in line 52 is removed via line 67, repressured by blower 69 and employed as lift gas via line 69 to carry the desorbed hot charcoal through the cooling zone 70 and back into the adsorption tower. An extension 75 of conduit 63 provides for draining solids from the system and is provided with a valve 75a. The remaining charcoal cooling may be carried out in the adsorption section of the tower, as by one or more heat exchange coils 65, immediately above the point of feed entry where the bulk of the heavy ($C_3+$) material is adsorbed. The temperature of the adsorbent leaving the adsorption section is maintained at about 200° F. which corresponds to the temperature which would be reached at this point when cooling only in the cooler 70 with the exit charcoal temperature closely approaching that of the cooling water. A typical operation of the system described may be carried out at pressures of from 4 to 7 atmospheres, employing a feed gas supplied to the vessel at a temperature of about 120° F. The gas may be one derived from a refining operation and have a composition substantially as follows:

| Components: | Percentage |
|---|---|
| Inert gas | 26.1 |
| $CH_4$ | 20.7 |
| $C_2H_4$ | 19.4 |
| $C_2H_6$ | 18.1 |
| $C_3H_6$ | 9.9 |
| $C_3H_8$ | 5.4 |
| $C_4+$ | 0.4 |
| | 100.0 |

To initiate the operation set forth, the several plates of the vessel 51 must be charged with the fluidized, finely divided, solid adsorbent material. For this purpose, the fluidized, finely divided, solid adsorbent material may be introduced in a manner similar to that set forth with reference to Fig. 1. The valves 69a, 69b and 75a being closed, and the valves 63a and 72a being opened, the fluidized, finely divided, solids may be forced into the line 63 and upwardly therethrough into the vessel. At the same time, a fluidizing gas may be introduced, by way of the line 62, into the bottom of the vessel, and, if desired, by way of line 55 also, so as to maintain the fluidity of the introduced solids permitting them to flow upwardly through the vessel from plate to plate, primarily by way of the downcomers 5. This procedure is continued until the vessel has been flooded to a level approximating that of the uppermost weir 7 in the vessel, and covering or sealing the lower end of the dip-leg 64a and the conduit 71. At that time, the valve 72a is closed and valve 75a opened so as to partially drain fluidized solids from the vessel 51 by way of conduits 63 and 75, leaving a normal process level of fluidized solids on each plate 2 in the vessel at approximately the level of the weir members thereof, and sealing the lower end of each downcomer 5. Valves 75a and 63a are then closed, and valves 69a and 69b opened, and normal process flow of gaseous materials initiated by way of conduits 62 and 55. At substantially the same time, normal process flow of a portion of the tail gas leaving the vessel by way of conduit 52 may be initiated through the branch conduit 67, pump 68, and conduit 69 and a controlled flow of solids then initiated through valve 63a and conduit 63 for circulation of the solids through conduit 69, cooler 70, and conduit 71. In establishing the total volume of fluidized solid materials to be retained in the system after the initial charging step, allowance is made for the volume of such material required by the recirculation conduits 69 and 71 as well as the cooler 70.

As an alternate to the charging step set forth above, finely divided, fluidized, solid materials may be introduced into the tower in a dispersed phase in substantially the manner described with reference to Fig. 4, by way of either or both the feed lines 55 and 62 for gaseous materials, from the conduits 73 and 74 respectively. In addition, the vessel 51 may be provided for introduction of solid materials in substantially the manner shown and described with reference to Fig. 2.

In addition to its suitable employment in an adsorption process, as described with reference to Fig. 5, the invention is generally applicable to any process in which a fluidized, finely divided, solid material is passed downwardly through a contacting vessel in countercurrent relation to a gaseous material flowing upwardly therethrough. Other processes may include the synthesis of hydrocarbons from carbon monoxide and hydrogen, as by contacting the latter materials with a fluidized, finely divided, solid material such as iron and cobalt; the reduction of beneficiation of ores, as in contacting fluidized, finely divided, metallic materials with oxygen or a gas rich in oxygen, or with other suitable materials in gaseous or vaporous form; the polymerization of olefinic hydrocarbon materials by contact with suitable solid polymerization catalysts; as well as hydrogenation, dehydrogenation, alkylation, isomerization, etc.

A further example of such employment of the invention is in conjunction with a process for catalytic conversion of hydrocarbons in the presence of a fluidized, finely divided, cracking catalyst. In such a process, the feed material may be a gas oil boiling in the range of from about 400° F. to 700° F. and higher, supplied to the contacting column as a vapor, and contacted with a suitable catalyst of which a major portion has a particle size of from about 10 to about 150 microns. Suitable catalyst materials may be selected from materials such as acid activated bentonite clays, synthetic gels containing silica and alumina, or silica and magnesia, and other well-known cracking catalyst materials. Temperatures employed in such a process may be in the range of from about 700° F. to about 1050° F., and pressures in the range of from substantially atmospheric pressure to about 50 p. s. i. g., all as well known to those skilled in the art.

In initiating operation of the processes as described, the density of the solids handled may range from about 0.5 pound per cubic foot, to about 40 pounds per cubic foot, depending upon whether the material is being introduced in a dense or dispersed phase. Where, as illustrated by Fig. 4, the solid materials are to be introduced in the dispersed phase, the velocity of the gaseous transfer medium passed through the line 11 may be as high as 10 to 15 feet per second for smooth operation.

Although most particularly described with reference to the charging step involved, the invention further contemplates a step-wise process operation involving a sequence of steps as in either procedure outlined below:

Procedure A

1. A fluidized, finely divided, solid process material is introduced into a contacting vessel, by generally upward flow, so as to load each of a series of transverse plates therein with fluidized solid material to a level at least above the lower ends of the downcomers to each plate, while maintaining a continuous flow of a gaseous material upwardly through the plates and the vessel, maintaining fluidity of the solids introduced.

2. Upon loading of the plates to the desired level, introduction of solids according to step 1 is discontinued.

3. The normal process flow of solid materials downwardly into the vessel is then begun.

4. Simultaneously or consecutively beginning normal process flow of a gaseous material, to be contacted with the solids, upwardly through the vessel.

5. Then withdrawing solids from the vessel in normal process flow, but at an accelerated rate, until the required plate levels have been established.

Procedure B

1. A fluidized, finely divided, solid process material is introduced into a contacting vessel, by generally upwardly flow, so as to load each of a series of transverse plates therein with fluidized, solid material to a level at least above the lower ends of the downcomers to each plate, while maintaining a continuous flow of a gaseous material upwardly through the plates and the vessel, maintaining fluidity of the solids introduced.

2. Upon loading of the plates to the desired level, introduction of solids according to step 1 is discontinued.

3. Withdrawing excess solids from the vessel, downwardly, while continuing upward flow of the fluidizing gaseous material.

4. Simultaneously or consecutively beginning normal process flow of a gaseous material, to be contacted with the solids, upwardly through the vessel.

5. Then withdrawing solids from the vessel in normal process flow, but at an accelerated rate, until the required plate levels have been established.

In either procedure, the fluidizing gas introduced as in steps 1 and 2 may be the process material, or another material, preferably an inert gas. Likewise, pressures, densities, velocity flow and other conditions may be normal process flow conditions during the steps 1 and 2, or they may be varied in any manner to obtain the desired results. Also, the solids introduced according to step 1, may be introduced in either a dispersed or dense phase, either (a) By way of the normal process outlet for solids from the vessel;

(b) By introduction of solids at each plate location in the vessel;

(c) By a combination of either (a) and (b) above;

(d) By introduction as a dispersed phase by way of a normal process inlet for gaseous material into the vessel; or (e) By a combination of (a), (b), or (c) with (d).

What is claimed is:

1. In a process for contacting gaseous process materials with fluidized, finely divided, solid materials in a series of superimposed, successively communicating contacting zones defined by a vertically spaced series of perforated supporting means on which said solid materials are maintained as fluidized beds of substantially predetermined depth, and in which process said gaseous material is passed upwardly and said solid materials downwardly through said zones in countercurrent flow relation, the improvement which comprises the steps of initially introducing fluidized finely divided, solid material into substantially concurrent flow relation with a stream of gaseous material being passed upwardly through said series of zones, and charging the several zones in said series with a mass of solid material to a depth substantially in excess of the operating depth predetermined for said beds, then discontinuing introduction of said solid material in concurrent flow relation with said gaseous material, followed by the steps including initiating process flow of said fluidized, finely divided, solid material downwardly through said zones and from zone to zone, and removing from the series of zones the solid material in excess of said predetermined operating depth of the bed in each zone.

2. A process according to claim 1, in which the solid material in excess of said predetermined operating depth of the bed in each zone is removed prior to initiating process flow of said solid material.

3. A process according to claim 1, in which said solid material is initially introduced as a plurality of individual streams of such material separately into each zone of said series of zones, charging all of said zones substantially simultaneously.

4. A process according to claim 1, in which said solid material is initially introduced as a single stream of such material into the lowermost zone in the series of superimposed zones, substantially filling the several zones thereof in upward succession.

5. A process according to claim 1, in which said solid material is initially introduced as a dispersal of such material in said stream of gaseous material passed upwardly through said zones.

6. A process according to claim 1 in which the solid material in excess of said predetermined operating depth of the bed in each zone is removed from said series of zones subsequent to initiating downward process flow of said solid material.

7. A process according to claim 1 in which the steps of initiating process flow of said solid material and removal of solid material in excess of said predetermined depth of the bed in each zone are accomplished substantially simultaneously, and in which the removal of said excess solid material is at a rate accelerated above downward process flow thereof through said zones.

8. In a process for contacting gaseous process materials with fluidized, finely divided, solid materials, in a series of superimposed, successively communicating, contacting zones defined by a vertically spaced series of perforated supporting means on which said solid materials are maintained as fluidized beds of substantially predetermined depth, and, in which process said gaseous material is passed upwardly and said solid materials downwardly through said zones in countercurrent flow relation, the improvement which comprises the steps of initially introducing fluidized, finely divided, solid material into substantially concurrent flow relation with a stream of a substantially inert, non-process, gaseous material being passed upwardly through said series of zones, and charging the several zones in said series with a mass of solid material to a depth substantially in excess of the operating depth predetermined for said beds, then discontinuing introduction of said solid material in concurrent flow relation with said gaseous material, and thereafter initiating process flow of said gaseous process material and fluidized, finely divided, solid material including the steps of passing said solid material from zone to zone downwardly through said series of zones, while passing the gaseous process material upwardly therethrough, and removing from said series of zones the solid material present in excess of said predetermined operating depth of the bed in each zone.

9. A process according to claim 8 in which the introduction of said substantially inert gaseous material is continued after initiating downward process flow of said finely divided, solid material and until the removal of said solid material in excess of said predetermined operating depth of the bed in each zone has been completed, and then initiating upward process flow of a gaseous process material to be contacted with said solid material.

BYRON V. MOLSTEDT.

References Cited in the file of this patent

UNITED STATES PATENTS

| Number | Name | Date |
| --- | --- | --- |
| 2,270,903 | Rudbach | Jan. 27, 1942 |
| 2,444,990 | Hemminger | July 13, 1948 |